INVENTOR
HOMER E. BENSON

United States Patent Office 3,503,724
Patented Mar. 31, 1970

3,503,724
METHOD AND APPARATUS FOR PRODUCING MIXTURES OF METHANE, CARBON MONOXIDE, AND HYDROGEN
Homer E. Benson, Pittsburgh, Pa., assignor to Consolidation Coal Company, Pittsburgh, Pa., a corporation of Delaware
Continuation of application Ser. No. 598,072, Nov. 30, 1966. This application Apr. 14, 1969, Ser. No. 816,000
Int. Cl. C10j 3/00; C01b 1/08
U.S. Cl. 48—73    21 Claims

ABSTRACT OF THE DISCLOSURE

In a continuous steam-iron process wherein finely divided iron oxides are reduced in a reduction zone and the reduced iron oxides are reacted with steam in an oxidation zone to make hydrogen, the improvement whereby high B.t.u. gas may be made from carbonaceous materials which comprises effecting hydrogasification of carbonaceous material in said oxidation zone, and combustion of carbonaceous material in said reduction zone, so that only two zones, instead of the usual four, are required for making high B.t.u. gas by the steam-iron process.

---

This application is a continuation of my copending application, Ser. No. 598,072, filed Nov. 30, 1966, now abandoned, and assigned to the assignee of the present application.

This application relates to the production of mixtures of methane, carbon monoxide and hydrogen which are particularly suitable for the preparation of high B.t.u. gas from carbonaceous material such as coal, crude oil, residual oil or distillate fuels. The present invention is particularly useful for making high B.t.u. pipeline gas from coal; and, therefore, it will be described with reference to coal, although other carbonaceous materials can be used as feedstock.

In U.S. Patent No. 3,222,147 I have described a process for the preparation of mixtures of hydrogen, carbon monoxide and methane in which the steam-iron process is used to make hydrogen and steam by reacting metallic iron and lower oxides of iron with steam in one reaction vessel to produce a mixture of hydrogen and steam, which mixture is then reacted in a second reaction vessel with coal char to make a mixture of hydrogen, carbon monoxide and methane. The reaction in the first vessel oxidizes metallic iron and produces higher metal oxides. These metal oxides are reacted in a third reaction vessel with a reducing gas containing hydrogen and carbon monoxide to reduce the oxides to lower oxides and metallic iron for reuse in the first reaction vessel. The reducing gas is produced in a fourth reactor in which coal char, steam and air are reacted to make a producer gas containing carbon monoxide and hydrogen.

In my present invention, the iron oxidation and coal hydrogasification steps are carried out in one reaction vessel and the steps of generating producer gas and reducing iron oxide are carried out in a second reaction vessel.

This arrangement has a number of advantages over the four-reaction vessel system described and claimed in my U.S. Patent No. 3,222,147. There are fewer vessels and, hence, less transfer of solids and gases. Raw coal that is difficult to use because of its agglomerating characteristics during hydrogasification can be used if it is mixed with iron. Therefore, it is not necessary to pretreat the raw coal prior to the hydrogasification step, and methane and hydrogen normally lost in pretreatment of coal become part of the product gases.

In the conventional steam-iron process, large quantities of spent reducing gas are produced which still contains 15–20% of hydrogen and carbon monoxide. The unused hydrogen and carbon monoxide present in the spent producer gas is approximately 40% of that contained in the fresh producer gas. The inefficient use of the reducing gas in the steam-iron process is due to the build-up of a maximum amount of carbon dioxide and water vapor in the spent gas and is a consequence of thermodynamic limitations inherent in the reduction of the iron oxides. In accordance with my invention, char is present in the reaction vessel in which iron oxides are reduced and it reacts with the carbon dioxide and water vapor to make additional hydrogen and carbon monoxide which are effective in reducing more iron oxide. Hence the amount of spent reducing gas is greatly reduced.

The oxidation of metallic iron and FeO with steam in the iron oxidizer vessel is exothermic and, in accordance with this invention, the heat developed by the reaction is used to support the endothermic steam-carbon reaction which also makes additional hydrogen and carbon monoxide. The hydrogenation of char to form methane is also highly exothermic and supplies heat for the steam-carbon reaction. Therefore, the addition of coal to the reaction vessel in which FeO and metallic iron are oxidized increases the efficiency of the overall process.

In the accompanying drawings, I have illustrated certain presently preferred embodiments of my invention in which.

Figure 1:
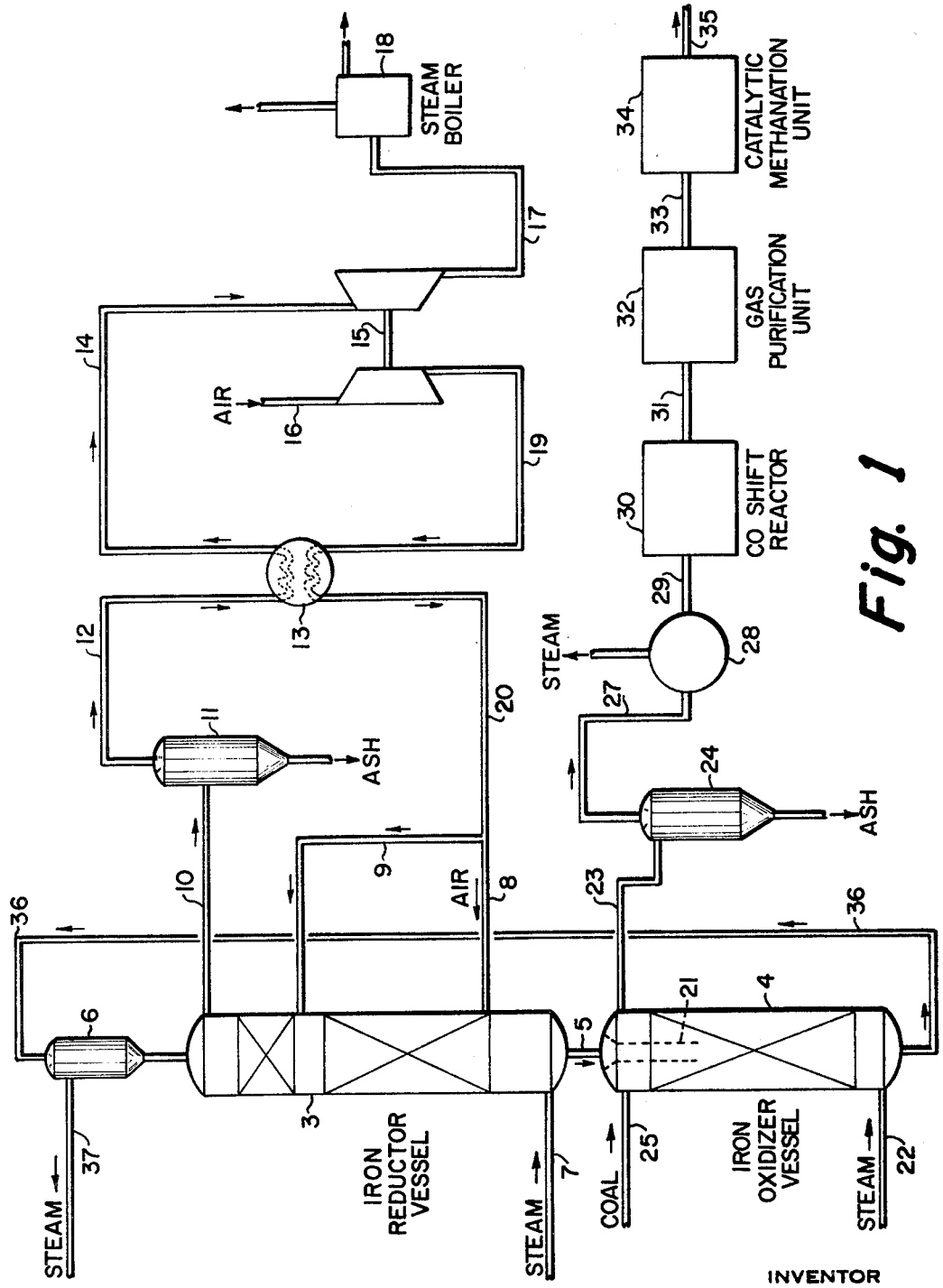
FIGURE 1 is a schematic diagram of a system for carrying out my invention.

Referring to FIGURE 1 of the drawings, the system comprises an iron reductor vessel 3 and an iron oxidizer vessel 4. These two vessels are vertically in line with each other and are connected by a pipe 5. Iron oxides and char which have been lifted to a cyclone separator 6 by a lift gas, such as steam, flow into the upper portion of the iron reductor vessel 3 and flow downwardly through that vessel. A small amount of steam may optionally be supplied to the bottom of the iron reductor through a pipe 7 and flows upwardly through the vessel countercurrently to the downward flow of iron oxide and char.

Air is supplied (with a small amount of steam, if desired for temperature control) to the iron reductor through a pipe 8 in a lower portion of the iron reductor. Air is also supplied through a pipe 9 to the upper portion of the reductor.

The following reactions take place in the iron reductor:

Reductor reactions:                        H calories (1472° F.)
(1) $O_2+C \rightarrow CO_2$ _____ −94,400
(2) $CO_2+C \rightarrow 2CO$ _____ 40,300
(3) $H_2O+C \rightarrow H_2+CO$ _____ 32,400
(4) $H_2+Fe_3O_4 \rightarrow 3FeO+H_2O$ _____ 11,900
(5) $H_2+FeO \rightarrow Fe+H_2O$ _____ 4,100
(6) $CO+Fe_3O_4 \rightarrow 3FeO+CO_2$ _____ −3,700
(7) $CO+FeO \rightarrow Fe+CO_2$ _____ −4,000
(8) $2C+Fe_3O_4 \rightarrow Fe+2FeO+2CO$ _____ 76,500

The oxygen in the air admitted through the pipe 8 reacts with coal char to form carbon dioxide (Reaction 1) which reacts more slowly with the char to make carbon monoxide. The reaction between oxygen and carbon is highly exothermic and furnishes the heat for Reactions 2 and 3 above. The reaction of carbon dioxide with carbon to make carbon monoxide is relatively slow and for that reason Reactions 4 through 7 in which iron oxide is reduced with hydrogen and carbon monoxide occur in the upper portion of the vessel. Reaction 8 shows the overall reaction of the reduction of $Fe_3O_4$ with carbon to metallic iron and FeO.

Air is introduced into the upper portion of the reductor vessel through the pipe 9 to burn spent producer gas and char to form carbon dioxide, thereby providing additional heat near the upper part of the reactor. Carbon dioxide and water vapor from Reactions 4 through 7 can react with additional char according to Reactions 2 and 3 to make additional reducing gas which is effective in reducing more iron oxide.

Thus, by having both char and iron oxide in the same reactor, it is possible to have all the reactions listed above proceed at the same time and the exothermic reactions provide the necessary heat for the endothermic reactions. Further, there is no transfer of solids and gases from one vessel to the other.

Spent producer gas flows out of the top of the iron reductor vessel 3 through the pipe 10 to a cyclone separator 11 which separates the ash. The spent producer gas then flows through the pipe 12 through a heat exchanger 13 and through a pipe 14 to a compressor-expander 15 having an air intake 16. The producer gas then flows through a pipe 17 to a steam boiler 18 which supplies process steam. Air from the compressor-expander 15 flows through pipe 19 through the heat exchanger 13 and a pipe 20 which connects to the pipes 8 and 9 which supply air to the iron reductor vessel 3.

Reduced iron oxides and metallic iron flow from the iron reductor vessel 3 through the pipe 5 to a conduit 21 extending downwardly into the top portion of the iron oxidizer vessel 4. From the lower end of the conduit 21 the iron oxides and metallic iron flow downwardly into a reaction zone beneath the conduit 21. Steam is supplied through a pipe 22 at the bottom of the iron oxidizer vessel 4 and flows upwardly therethrough countercurrently to the downward flow of reduced iron oxides and metallic iron.

Raw coal is supplied to the upper portion of the oxidizer vessel 4 through a pipe 25 and flows downwardly around the conduit 21 into the reaction zone below the conduit. While passing downwardly around the conduit 21, it is subjected to hot gases which (as hereinafter explained) flow upwardly in the upper portion of the vessel 4. The hot gases hydrocrack tars present in the raw coal into methane which becomes part of the product gases. The devolatilized coal flows into the reaction zone beneath the conduit 21 where it mixes with the reduced iron oxides and char from the iron reductor vessel 3.

The following reactions take place in the iron oxidizer vessel 4:

Oxidizer reactions:        H calories (1472° F.)
(9)    $H_2O + Fe \rightarrow FeO + H_2$       —4,100
(10)   $H_2O + 3FeO \rightarrow Fe_3O_4 + H_2$    —11,900
(11)   $H_2O + C \rightarrow H_2 + CO$        32,400
(12)   $2H_2 + C \rightarrow CH_4$           —21,800
(13)   Coal → $CH_4$ + Char At the bottom of the iron oxidizer vessel 4, steam reacts with reduced iron oxide and metallic iron in accordance with Reactions 9 and 10 to produce FeO and $Fe_3O_4$ and hydrogen. These reactions are exothermic. The hydrogen produced and unreacted steam as a mixture pass upwardly through the reactor and the steam reacts with the char to make additional hydrogen and carbon monoxide according to Reaction 11. At the top of the iron oxidizer vessel 4, the hydrogen produced in the lower portion of the vessel reacts with fresh coal and char to make methane according to Reaction 12. Methane is also produced by the pyrolysis of fresh coal according to Reaction 13.

Hydrogen, carbon monoxide and methane flow from the top of the iron oxidizer vessel 4 to pipe 23 which leads to a cyclone separator 24 which separates out the ash. Before leaving vessel 4, these gases flow upwardly in the upper portion of the vessel 4 around the conduit 21 countercurrently to the downwardly flowing raw coal and hydrocrack tars in the raw coal into methane which flows with these gases into the cyclone separator 24.

If it is found that the raw coal being fed into the top of the vessel 4 is agglomerating, the conduit 21 may be removed so that the raw coal fed to the vessel may be immediately mixed with the reduced oxides and metallic iron flowing into the vessel 4 through the pipe 5.

The product gas then flows through a pipe 27 to a waste heat boiler 28 which also supplies process steam. From the waste heat boiler, the gas flows through pipe 29 to a CO shift reactor 30 which adjusts the hydrogen to carbon monoxide ratio to approximately 3:1, a preferred ratio for catalytic methanation. From the shift reactor, the gas flows through pipe 31 to a gas purification unit 32 and from that unit through a pipe 33 to a catalytic methanation unit 34 which converts the hydrogen and carbon monoxide to methane. The product from the methanation unit 34 comprises a high B.t.u. pipeline gas which is withdrawn through pipe 35.

Higher oxides of iron and char are withdrawn from the bottom of the iron oxidizer vessel 4 and are conveyed by a steam lift 36 to the cyclone separator 6 positioned above the iron reductor vessel 3. As noted above, the iron oxides and char pass from the separator 6 to the iron reductor vessel 3 and steam flows out of the pipe 37 which may be connected to the pipe 22 which supplies steam to the bottom of the iron oxidizer vessel 4.

In the stem-iron process, a maximum conversion of only about 50 percent of the steam is possible because of the limits imposed by the thermodynamics of the $H_2O$–Fe system. In the operation of this system, the hydrogen concentration builds up in accordance with Reaction 9 and an equilibrium ratio of $H_2O:H_2$ is attained. However, in accordance with my invention in which carbon is present in the oxidizer, some of the hydrogen will react to form methane in accordance with Reaction 12 thereby allowing more steam to be converted to additional hydrogen by lowering the concentration of the $H_2$ and allowing Reaction 9 to continue further to the right as it is expressed above. Thus, the presence of coal with iron and lower oxides of iron in the oxidizer produces greater overall conversion of the steam than in the conventional steam-iron process.

As is the case with the reactions in the iron reductor vessel 3, the exothermic reactions in the iron oxidizer vessel 4 provide the heat necessary for the steam-carbon reaction which is high endothermic. By virtue of the heat created by the exothermic reactions and the presence of steam, the steam reacts with the char to make additional hydrogen and carbon monoxide which form part of the product gas and which are substantially catalytically converted to methane. The steam-carbon reaction also prevents the exothermic reaction between hydrogen and char from raising the temperature in the oxidizer to such an extent that methane formation is retarded by thermodynamic limitations. Also, the oxidation and hydrogasification are carried out in one vessel instead of two as is disclosed in my prior U.S. Patent No. 3,222,147, and there is no transfer of solids and gases from one vessel to another.

As described, the contact between the gases and solids in both vessels 3 and 4 is preferably countercurrent. The contact may be accomplished in fluidized beds or by free-falling solids in baffled or unbaffled beds.

Temperatures of operation ranging between 1000 and 2000° F. are practical, but a preferable temperature range is between 1300 and 1800° F. The temperatures are regulated by control of the amounts of air and steam fed into reaction vessels 3 and 4. For instance, if steam is admitted to the bottom of the iron reductor vessel 3 at a point below that at which air is introduced into the vessel, and if the steam is relatively cool, it will lower the temperature of the iron-char mixture passing into the iron oxidizer vessel 4. Higher yields of methane are obtained by a lower temperature in the upper portion of the iron oxidizer vessel. Preferably, the temperature in this portion of the oxidizer vessel ranges between 1200 and 1500° F. Because the coal fed into the circulating solids is cold, it will also reduce the temperature at this point.

Pressures that are desirable for this process range from a minimum of 200 p.s.i.g. to 2000 p.s.i.g. Relatively high pressures results in high hydrogen partial pressures which are beneficial in obtaining more methane from the hydrogen-carbon reaction. A preferable operating range is from 300 p.s.i.g. to about 1200 p.s.i.g.

The overall consumption of fresh coal in the process is such that the ratio of circulation of the iron to that of the fresh coal fed is about 10:1 by weight. It has been determined, however, that the rates of reaction for oxidation of the iron are several fold that of the coal char reactions. Therefore, as the char and iron are circulated there will be a build-up of char content in the mixture until a steady state is obtained at the particular temperature level maintained in the reactors so that the char consumption reaction rate exactly equals the coal feed rate. For instance, at a suitable typical operating temperature, the steady state composition of the solids may be 50 percent char and 50 percent iron.

Particle sizes of the iron can conveniently be in the range of 10 to 250 mesh and coal particle sizes can be in the same range. Gas velocities through the reactors are a means of control of contact time and range from about 0.3 to a foot per second to about 5 feet per second.

Because of the considerable difference in density between the char and the circulating iron, it is possible to vary the concentration of the lower density char at places in the system so as to compensate for the longer reaction times required for the reactions involving char. It is also possible to keep a substantial portion of the char out of those portions of the system where its presence is not required.

Figure 2:
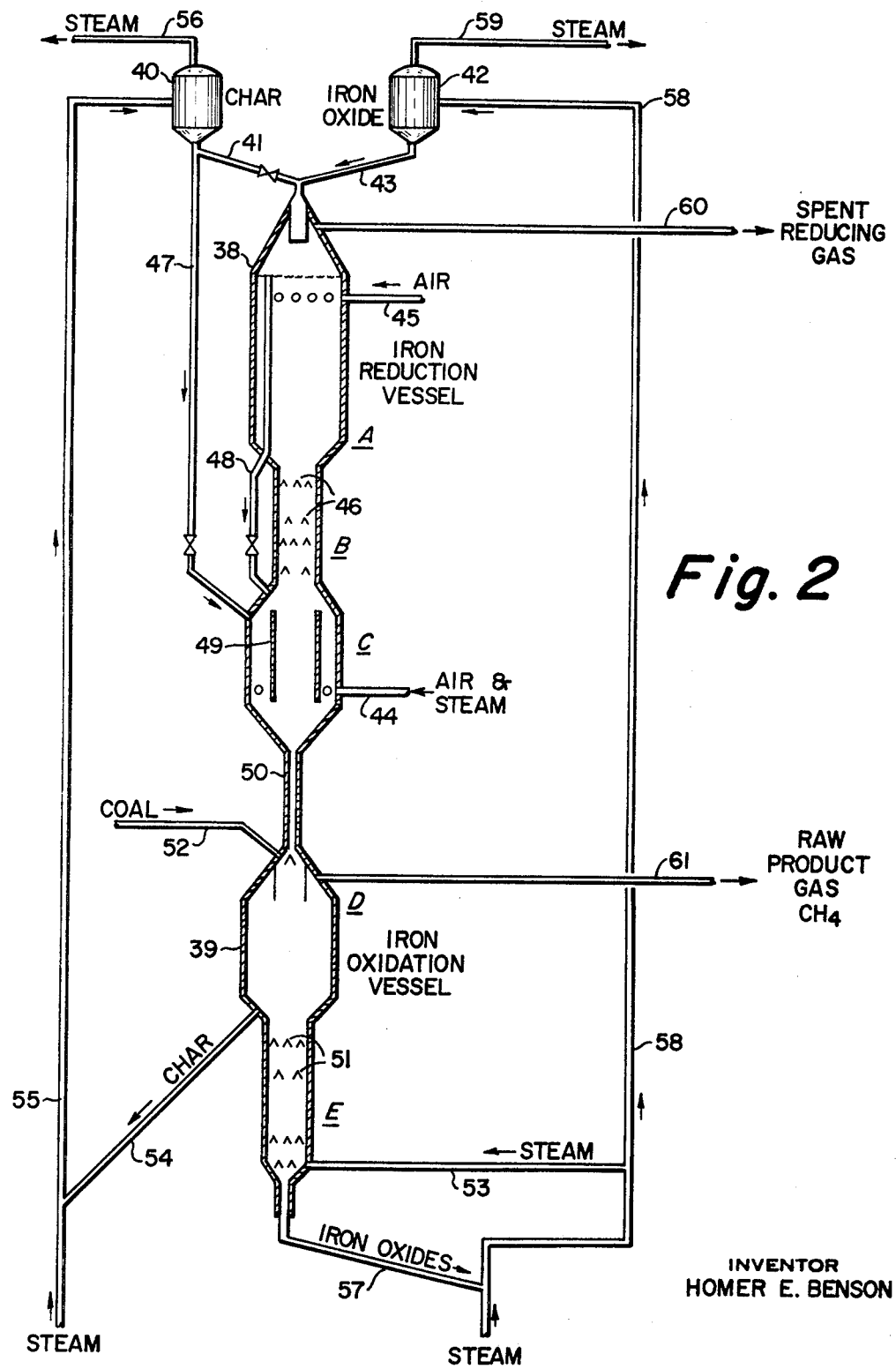
FIGURE 2 is a vertical section of one form of apparatus for carrying out the process of my invention.

FIGURE 2 shows a modified form of apparatus in which the concentration of the char in various portions of the system can be varied. The apparatus comprises an iron reduction vessel 38 and an iron oxidation vessel 39. As appears in FIGURE 2, the iron reduction vessel 38 comprises three portions marked A, B, and C in the drawing. Portions A and C have approximately the same cross-sectional area whereas the cross-sectional area of portion B is substantially reduced. Char is fed from a cyclone separator 40 through a pipe 41 to the top of the upper portion A of the reduction vessel and iron oxide is fed from a cyclone separator 42 through a pipe 43 to the top of the reduction vessel where it is mixed with the char. The resulting mixture flows downwardly through the reduction vessel. Air and steam are supplied to the bottom of the reduction vessel through a pipe 44 and additional air is supplied adjacent the upper portion of the reduction vessel through a pipe 45. The steam and air supplied to the bottom of the reduction vessel flow countercurrently to the char and iron oxide.

At any particular linear gas velocity, the char will be retained in the reduction vessel for a longer period of time than the iron oxide because the char is considerably less dense than the iron. Therefore, in portion A of the reduction vessel which has a larger cross-section than the portion B, the linear velocity of the gases will decrease through this portion, thereby allowing the iron oxides to fall rapidly through this section, and the less dense char will be retained for a longer period of time. This compensates for the fact that the reactions of water vapor and carbon dioxide in the spent reducing gas with char are relatively slow in comparison to the reactions involving the iron oxides. In portion B of the reduction vessel, the linear velocity of the rising gases is increased due to the constricted cross-sectional area of this portion, and the velocities can be further increased by placing laterally-extending baffles 46 across this section. Instead of reducing the diameter of portion B relative to portions A and C, the diameter of this portion could be made the same as that of portions A and C and additional baffling added to obtain the desired gas velocities. The more dense iron oxides will fall rapidly through the portion A, but their rate of descent will decrease in the portion B. At the same time, the higher linear velocity of the gases in portion B will substantially prevent the entrance of char into this portion.

Char is required for reactions occurring in the portion C of the reduction vessel in which air is reacted with char to form carbon dioxide which in turn reacts with the char to form carbon monoxide. Therefore, char is supplied to the portion C directly from the cyclone separator 40 through the pipe 47. Char may also be supplied from the portion A of the reduction vessel in which it has been concentrated by means of the stand pipe 48.

As shown in the drawing, portion C of the reduction vessel has an internal hollow longitudinally-extending baffle 49, the walls of which are substantially in line with the walls of the portion B of the reduction vessel. Reduced oxides and metallic iron relatively low in char content flow from portion B of the reduction vessel through the baffle 49 and directly to a pipe 50 which connects the reduction vessel 38 and the oxidation vessel 39. This arrangement minimizes the possibility of lower oxides of iron and metallic iron which have been reduced in portions A and B of being reoxidized in portion C by air admitted through the pipe 44.

The oxidation vessel 39 comprises two portions D and E, the cross-section of portion E being substantially less than the cross-section of portion D. The portion E may also have laterally-extending baffles 51 which serve to further increase linear velocity of gases flowing upwardly through the oxidation vessel.

Coal is admitted to the top of the oxidation vessel through the pipe 52 where it mixes with reduced iron oxides and metallic iron flowing through the pipe 50. The reduced iron oxides and metallic iron flowing through the pipe 50 act as a solids leg which prevent gases in the oxidation vessel from flowing upwardly into the reduction vessel.

Steam is admitted to the bottom of the portion E of the oxidation vessel through a pipe 53. Because of the relatively small cross-section of the portion E of the oxidation vessel and the baffles 51, the steam flowing upwardly through the steam oxidation vessel has a relatively high flow rate through the portion E. This flow rate is reduced when the steam flows through the portion D so that the concentration of char can be kept relatively high in the portion D for the reasons explained above. Char may be withdrawn from the portion D through the pipe 54 which extends from the bottom of this portion to a steam lift line 55 which returns the char to the cyclone separator 40. Steam separated from the char in the separator 40 is returned to the lift line through the pipe 56.

The reduced iron oxides and metallic iron flow relatively rapidly through the portion D of the oxidation vessel into the portion E where the linear speed of fall is decreased by the relatively increased velocity of the steam. The steam admitted through pipe 53 reacts with the lower oxides and metallic iron in the portion E to form a mixture of approximately equal parts of hydrogen and steam. This mixture flows into the portion D where the water and hydrogen react, at relatively slow rates, with the char concentrated in this portion.

Higher oxides of iron are withdrawn from the bottom of the oxidation vessel through a line 57 to a steam lift line 58 which carries them to the cyclone separator 42 from which they return to the reduction vessel. Steam separated by the separator 42 can be returned through a line 59 to the lift line 58.

Spent reducing gas flows from the top of the reduction vessel through a line 60 which returns it to an energy recovery system such as shown in FIGURE 1. Product gas containing hydrogen, methane and carbon monoxide flows from the top of portion D of the oxidation vessel through line 61 to a carbon monoxide shift reactor, gas purifier and catalytic methanation unit as illustrated in FIGURE 1.

An example of operating the process described in this invention is as follows: In a large plant having a capacity of 90,000,000 s.c.f.d. of high B.t.u. gas, the circulation rate of iron-iron oxide mixture is about 90,000,000 lbs./day or 3,750,000 lbs./hour or 1875 tons/hour. This amount of iron generates about 90,000,000 s.c.f.d. of hydrogen. To this amount of circulating iron would be added 4,400 tons/day of coal or 183 tons/hour. This coal provides all of the energy required in the plant. Steam fed to the iron oxidizer vessels is 410,000 lbs./hour. To the iron reductor vessels are fed 482,000 lbs./hour of air and 96,000 lbs. of steam. Typical compositions of the various gas streams are shown below.

TABLE—GAS COMPOSITIONS

| | Spent reducing gas from iron reductor vessel, percent | Raw product gas from iron oxidizer vessel, percent | Pipeline gas after methanation, percent |
|---|---|---|---|
| CO | 9.9 | 13.2 | 0.1 |
| $CO_2$ | 23.9 | 7.6 | 0.5 |
| $H_2$ | 4.9 | 30.1 | 3.6 |
| $H_2O$ | 11.4 | 16.8 | |
| $CH_4$ | 3.8 | 30.1 | 91.9 |
| $C_2H_6$ | | 1.1 | 2.4 |
| $N_2$ | 45.8 | 0.7 | 1.5 |
| $H_2S$ | 0.3 | 0.4 | |
| Total | 100.0 | 100.0 | 100.0 |
| Volume, MM s.c.f.h. | 6.5 | 8.3 | 3.67 |

A cost estimate was made of a process for making pipeline gas from coal wherein: (1) Producer gas is made in a separate vessel from coal char, air and steam. (2) Iron oxide is reduced in a second vessel using the producer gas for a reduction gas. (3) Reduced circulating iron is contacted with steam in a third vessel making a mixture of hydrogen and steam. (4) The hydrogen and steam are fed to a fourth vessel where these gases contact coal char making a methane-rich gas. This plant, producing 90,000,000 s.c.f. of 1,000 B.t.u./s.c.f. gas per day, would cost $40,000,000. Gas from this plant would cost $0.51/m.c.f.

If the plant, however, is greatly simplified by mixing the coal with the iron and circulating the mixture between the iron reductor vessel and the iron oxidizer vessel in accordance with this invention, the plant cost decreases to only $30,000,000 for the same production. The gas produced by this improved process would cost $0.43/m.c.f., a savings of $.08/m.c.f. of gas made.

I claim:

1. A method for the gasification of carbonaceous material which comprises,
   (a) introducing into a first reaction zone iron oxides and carbonaceous material and flowing the mixture downwardly through the zone,
   (b) introducing air into said first zone in the lower portion thereof and flowing the air upwardly therein countercurrently to the iron oxide and carbonaceous material,
   (c) reacting the air with the iron oxides and carbonaceous material and said first reaction zone to reduce the oxides to lower oxides and metallic iron,
   (d) passing the lower oxides and metallic iron into a second reaction zone,
   (e) feeding carbonaceous material into said second reaction zone,
   (f) introducing steam into said second reaction zone,
   (g) reacting the steam with the carbonaceous material and iron and lower oxides of iron in said second reaction zone to oxidize the iron and lower oxides of iron and to hydrogenate the carbonaceous material to form methane, and
   (h) withdrawing a methane-containing gas from said second reaction zone and also withdrawing from said second reaction zone higher iron oxides and returning the oxides to said first reaction zone.

2. The method described in claim 1 in which the major portion of the carbonaceous material is separated from the lower iron oxides and metallic iron adjacent the midpoint of said second reaction zone and in which the lower oxides and metallic iron are reacted with steam in the lower portion of said second reaction zone.

3. The method as described in claim 1 in which the metallic iron and the lower oxides of iron are oxidized with steam in the lower portions of said second reaction zone to form steam and hydrogen and in which the carbonaceous material is reacted in the upper portion of said zone with hydrogen formed in the lower portion of said zone to form methane.

4. The method as described in claim 1 in which the velocity of the flow of steam in the second reaction zone is decreased in the upper portion of the zone to increase the concentration of carbonaceous material relative to iron oxide and metallic iron in said upper portion.

5. A method for producing methane, carbon monoxide and hydrogen which comprises,
   (a) introducing into a first reaction zone iron oxides and carbonaceous material and flowing the mixture downwardly through the zone,
   (b) introducing air into said first zone in the lower portion thereof and flowing the air upwardly therein countercurrently to the iron oxide and carbonaceous material,
   (c) reacting the air with the iron oxides and carbonaceous material in said first reaction zone to reduce the oxides to lower oxides and metallic iron,
   (d) passing the lower oxides and metallic iron into a second reaction zone and flowing the lower oxides and metallic iron downwardly in said second zone,
   (e) feeding carbonaceous material into the top of said second reaction zone and flowing the carbonaceous material downwardly in said second zone,
   (f) introducing steam into said second reaction zone at a point adjacent its bottom and flowing it upwardly therethrough countercurrently to the carbonaceous material and the iron and lower oxides of iron,
   (g) reacting the steam with the carbonaceous material and iron and lower oxides of iron in said second reaction zone to oxidize the iron and lower oxides of iron and to hydrogenate the carbonaceous material to form methane, and
   (h) withdrawing from the top of said second reaction zone hydrogen, carbon monoxide, and methane and withdrawing from the bottom of said second reaction zone higher iron oxides and returning the oxides to said first reaction zone.

6. The method described in claim 5 in which steam is introduced into the lower portion of said first reaction zone.

7. The method described in claim 5 in which the concentration of carbonaceous material relative to iron oxide is increased in the upper portion of said first reaction zone and reduced in the middle portion of said zone, and at least partially separated from reduced iron oxides and metallic iron in the lower portion of said zone.

8. The method described in claim 5 in which hydrogen and carbon monoxide are formed in the lower portion of the first reaction zone, flow upwardly in said zone and react with the iron oxides in the middle portion of said zone to reduce the oxides, and in which steam and carbon dioxide react with the carbonaceous material in the upper portion of said zone to form carbon monoxide and hydrogen which react with the iron oxides in the upper portion of the first zone to reduce said oxides.

9. The method as described in claim 5 in which air is also introduced in the portion of the first reaction zone into which the carbonaceous material is introduced to react with said material and spent reducing gases to provide additional heat and form carbon dioxide which reacts with the carbonaceous material to form carbon monoxide.

10. The method as described in claim 5 in which the velocities of flow of the air and steam are varied in different portions of the reaction zone so as to vary the relative concentrations of carbonaceous materials and iron oxides in said portions.

11. The method as described in claim 5 in which the velocity of flow of the air in the first reaction zone is decreased in the upper portion of the zone to increase the concentration of carbonaceous material relative to iron oxide in said upper portion.

12. The method as described in claim 5 in which the reactions are carried out under pressure ranging from 200 p.s.i.g. to 2000 p.s.i.g.

13. The method as described in claim 5 in which the reactions are carried out under pressure ranging from 300 p.s.i.g. to 1200 p.s.i.g.

14. The method as described in claim 5 in which the reactions are carried out at temperatures ranging from 1000 to 2000° F.

15. The method as described in claim 5 in which the reactions in the upper portion of the second reaction zone are carried out at temperatures ranging from 1200 to 1500° F.

16. Apparatus for the production of methane, carbon monoxide and hydrogen which comprises,
 (a) a first reaction vessel in the form of a vertically disposed elongated vessel with enclosing top, bottom and outer walls,
 (b) inlets adjacent the top of the vessel for the supply of carbonaceous material and iron oxide to flow downwardly in the vessel,
 (c) inlets adjacent the bottom of the vessel for the supply of air and steam to flow upwardly in the vessel,
 (d) said vessel having three portions, an upper, a lower and a central portion, the upper and lower portions having approximately the same area for the flow of gases and the central portion having a reduced flow area whereby the velocity of the upwardly flowing air and steam is increased in the central portion,
 (e) a second reaction vessel in the form of an elongated vessel connected to said first to receive carbonaceous material, reduced iron oxides and metallic iron from the first reaction vessel,
 (f) an inlet adjacent the top of the second reaction vessel for the supply of carbonaceous material to flow downwardly in the vessel with material received from the first reaction vessel,
 (g) an inlet adjacent the bottom of the second reaction vessel for the supply of steam to flow upwardly in said vessel,
 (h) said vessel having two portions, the lower portion having an area for the flow of gases less than the upper portion whereby the velocity of the upwardly flowing steam is greater in the lower portion than in the upper portion,
 (i) means for withdrawing carbonaceous material from the upper portion of said second vessel,
 (j) an outlet adjacent the top of the second portion for the product gas, and
 (k) means for withdrawing iron oxides and carbonaceous material from the bottom of the second reactor vessel and returning them to the top of the first reaction vessel.

17. Apparatus as described in claim 16 in which the middle portion of the first reaction vessel has laterally extending baffles to increase the velocity of the gas flow in that portion.

18. Apparatus as described in claim 16 in which the middle portion of the first reaction vessel has a cross-sectional area less than the cross-sectional areas of the other portions to increase the velocity of the gas flow in the middle portion.

19. Apparatus as described in claim 16 in which the lower portion of the second reaction vessel has laterally extending baffles to increase the velocity of the gas flow in that portion.

20. Apparatus as described in claim 16 in which the lower portion of the second reaction vessel has a cross-sectional area less than the cross-sectional area of the upper portion to increase the velocity of the gas flow in the lower portion.

21. Apparatus as described in claim 16 in which the lower portion of the first reaction vessel has within it a hollow elongated baffle the walls of which are substantially in line with the outer walls of the middle portion of the vessel whereby reduced iron oxides and metallic iron are substantially separated from carbonaceous material in said lower portion.

References Cited

UNITED STATES PATENTS

| | | | |
|---|---|---|---|
| 2,640,034 | 5/1953 | Jones | 252—373 |
| 2,794,725 | 6/1957 | Scharmann | 48—206 |
| 2,888,395 | 5/1959 | Henny | 208—111 |
| 3,017,250 | 1/1962 | Watkins | 23—214 |
| 3,031,287 | 4/1962 | Benson et al. | 48—197 |
| 3,226,204 | 12/1962 | Stotler et al. | 23—214 X |
| 3,442,619 | 5/1969 | Huebler et al. | 23—214 |
| 3,442,620 | 5/1969 | Huebler et al. | 23—214 |

JOSEPH SCOVRONEK, Primary Examiner

U.S. Cl. X.R.

23—214; 48—63, 76, 197, 202, 203, 206, 214, 215